United States Patent [19]

Lee et al.

[11] Patent Number: 5,757,103
[45] Date of Patent: May 26, 1998

[54] TUNING FORK TYPE GYROSCOPE

[75] Inventors: Byung-leul Lee, Kyungki-do; Young-ho Cho, Daejeon; Ci-moo Song, Sungnam, all of Rep. of Korea

[73] Assignees: Samsung Electronics Co., Ltd., Kyungki-Do; Korea Advanced Institute of Science and Technology, Taejon, both of Rep. of Korea

[21] Appl. No.: 646,814

[22] Filed: May 21, 1996

[30] Foreign Application Priority Data

May 25, 1995 [KR] Rep. of Korea .................. 95-13257

[51] Int. Cl.$^6$ .............................................. G01P 15/00
[52] U.S. Cl. ........................ 310/309; 73/510; 73/504.04
[58] Field of Search ........................... 310/309, 370; 73/510, 504, 12; 257/418, 420

[56] References Cited

U.S. PATENT DOCUMENTS

| | | | |
|---|---|---|---|
| 5,016,072 | 5/1991 | Greiff | 357/26 |
| 5,126,812 | 6/1992 | Greiff | 357/25 |
| 5,329,815 | 7/1994 | Dunn et al. | 73/505 |
| 5,331,852 | 7/1994 | Greiff et al. | 73/505 |
| 5,349,855 | 9/1994 | Bernstein et al. | 73/505 |
| 5,359,893 | 11/1994 | Dunn | 73/505 |
| 5,473,945 | 12/1995 | Grieff et al. | 73/510 |
| 5,492,596 | 2/1996 | Cho | 156/632.1 |
| 5,500,549 | 3/1996 | Takeuchi et al. | 257/415 |
| 5,604,312 | 2/1997 | Lutz | 73/504.14 |
| 5,627,318 | 5/1997 | Fujii et al. | 73/514.32 |
| 5,635,639 | 6/1997 | Greiff et al. | 73/504.04 |
| 5,635,739 | 6/1997 | Grieff et al. | 257/254 |

*Primary Examiner*—Thomas M. Dougherty
*Attorney, Agent, or Firm*—Burns, Doane, Swecker & Mathis, L.L.P.

[57] ABSTRACT

A tuning fork type gyroscope includes a vibratory structure arranged to be spaced from a plane formed by a first axis and a second axis perpendicular thereto in a third axial direction perpendicular to the plane, driving means for vibrating the vibratory structure in the second axial direction by an electrostatic force, sensor electrode means arranged on said plane so as to sense displacement of the vibratory structure in the third axial direction while the vibratory structure moves with an angular velocity in the first axis, upper torque electrode means for balancing the force, arranged over the vibratory structure so as to control displacement of the vibratory structure in the third axial direction, and lower torque electrode means for balancing the force, arranged under the vibratory structure so as to control displacement of the vibratory structure in the third axial direction. Therefore, the distortion of the vibratory structure can be efficiently prevented, and an angular velocity can be accurately measured.

12 Claims, 4 Drawing Sheets

5,757,103

TUNING FORK TYPE GYROSCOPE

BACKGROUND OF THE INVENTION

The present invention relates to a tuning fork type gyroscope, and more particularly, to a tuning fork type gyroscope in which force balancing is achieved when detecting an angular velocity by signal-processing the Coriolis force obtained by vector multiplication of the linear velocity and the angular velocity of an inertial object.

A gyroscope for detecting the angular velocity of an inertial object has been employed as a core part of a navigation apparatus for guided missiles, sea-going vessels or aircraft. The application of gyroscopes is currently being extended in fields such as a navigation apparatus for automobiles or an apparatus for detecting and correcting an operator's hand quiver in a high-magnification video camera (e.g., a camcorder). A conventional gyroscope for sensing the angular velocity is manufactured by assembling of a multitude of complex parts requiring precision machining. Thus, due to burdensome manufacturing costs and a large-scale structure, it is inadequate for general industrial purposes or in home-use electrical products.

Recently, a small gyroscope where piezoelectric elements are attached to a beam in the shape of triangular prism has been developed by a Japanese company (Murata), and which is employed as a hand-quiver sensor for video cameras. Further, to overcome difficulties in manufacturing the gyroscope having the piezoelectric elements, another Japanese company (Tokin) has developed a small gyroscope having a cylindrical beam structure.

However, since both of these gyroscopes require precision machining, their manufacture is difficult and a high cost is necessary. Also, since the gyroscopes are made of a multitude of mechanical parts, it is difficult to be developed as a circuit-integrated device.

In the meantime, to improve the above-mentioned gyroscopes, the more economical and accurate gyroscope is under development using a micro-machining technology.

The principle of the gyroscope is that when the inertial object uniformly vibrating or rotating in a first axial direction receives an force input of the angular velocity in a second axial direction perpendicular to the first axis, the Coriolis force generated in a third axial direction perpendicular to both the first and second axes is detected to thereby calculate the angular velocity. Here, if the displacement of the inertial object by the Coriolis force is detected to be in a equilibrium state as a reaction force for balancing the Coriolis force is applied, it is possible to improve the accuracy, the linearity, and the bandwidth of detected signal.

FIG. 1 is a perspective view schematically illustrating a force balancing type micro-gyroscope which is developed by a U.S. company (The Charles Stark Draper Laboratory, Inc.) using the micro-machining technology (see U.S. Pat. No. 5,016,072). In this embodiment of the prior art, electrodes 11a and 11b extended in the Y-axial direction are disposed under a vibratory structure, and electrostatic force is applied to outer gimbals 12a and 12b through the electrodes 11a and 11b. When the vibratory structure rotates about the X-axis, an inner gimbal 13 moves in the Z-axial direction. The movements of the inner gimbal 13 are detected by a change of capacitance at outer electrodes 14a and 14b extended in the Z-axial direction.

Here, to equilibrate forces applied to an inertial object 15 connected to the inner gimbals 13, the electrostatic force to control the displacement of the inertial object 15 is applied through the inner electrodes 16a and 16b extended in the z-axial direction.

However, such a structure of the gyroscope manufactured in a semiconductor fabrication process becomes sophisticated, thus resulting in lower yield. Also, while a vertical component (X-axis) of the angular velocity can be detected, other components of the angular velocity can not be detected. Further, since the electrodes 16a and 16b for balancing force are arranged only over or under the vibratory structure, stability in controlling and measuring is degraded and the detection of the angular velocity becomes complex.

In FIG. 2, a comb motor type gyroscope using the tuning fork mode developed by the Charles Stark Draper Laboratory, Inc. is illustrated (see U.S. Pat. No. 5,349,855). The fundamental principle of operation is similar to that of the gyroscope of FIG. 1. That is, a vibratory structure 21 is fixed to a fixing portion 22a and 22b (which suspends and secures the vibratory structure 21 above a substrate) by a portion 23a and 23b having a narrow width. Fixing portions of the devices are shown by diagonal dashed lines in FIGS. 2 and 3. To measure an angular velocity Ω when the vibratory structure 21 rotates about the x-axis, an electrostatic force is applied to the vibratory structure 21 by left and right terminals 24a and 24b (terminals and electrodes being shown by solid diagonal lines in FIGS. 2 and 3) through combs 25a and 25b arranged at both ends of the gyroscope, which leads to vibration of the tuning fork mode in the y-axial direction by application of an alternating voltage to the comb structure, thereby inducing a vibrating action. Here, a terminal 26 is connected to a comb 27 disposed in a central portion of the vibratory structure 21 in order to detect whether the electrostatic force by the left and right terminals 24a and 24b is adequately applied to the vibratory structure 21.

When the inertial object rotates about the x-axis with the electrostatic force being applied by the terminals 24a and 24b, the Coriolis force occurs in z-axial direction, which causes the displacement of the vibratory structure 21 in z-axial direction. Such a displacement serves as the force for distorting the vibratory structure 21. The distortion of the vibratory structure 21 is detected from the change of capacitance at two electrodes 28a and 28b arranged under the vibratory structure 21, and thereby the Coriolis force can be measured via outputs at terminals 24e and 24f. Since the vibratory structure 21 displaces in the z-axial direction, i.e., being distorted as described above, the electrostatic force for controlling the distortion is generated by torque electrodes 29a and 29b disposed under the vibratory structure 21. Each of the torque electrodes 29a and 29b is diagonally arranged at two positions under the vibratory structure 21 and connected to motors 24c and 24d and exerts the balancing force for controlling the distortion of the vibratory structure 21.

However, since the toque electrode 29a and 29b for controlling the distortion of the vibratory structure 21 are arranged only under the vibratory structure 21, efficient controlling of the vibratory structure 21 is not possible and there is a limit of improving a response. Also, since the arrangement of the torque electrodes 29a and 29b is limited to only two positions, the distortion force of the vibratory structure 21 can not be efficiently balanced.

SUMMARY OF THE INVENTION

To solve the above problems, it is an object of the present invention to provide a gyroscope having improved torque electrodes by which distortion of a vibratory structure of the gyroscope can be efficiently controlled.

It is another object of the present invention to provide a gyroscope in which measurement of an angular velocity is performed more efficiently by balancing the distortion force of the vibratory structure.

Accordingly, to achieve the above objects, there is provided a tuning fork type gyroscope comprising: a vibratory structure arranged to be spaced from a plane formed by a first axis and a second axis perpendicular thereto in a third axial direction perpendicular to the plane; driving means for vibrating the vibratory structure in the second axial direction by an electrostatic force; sensor electrode means arranged on the plane so as to sense displacement of the vibratory structure in the third axial direction while the vibratory structure moves with an angular velocity in the first axis; upper torque electrode means for balancing the force, arranged over the vibratory structure so as to control displacement of the vibratory structure in the third axial direction; and lower torque electrode means for balancing the force, arranged under the vibratory structure so as to control displacement of the vibratory structure in the third axial direction.

It is preferred in the present invention that the lower torque electrode means includes first, second, third and fourth lower torque electrodes symmetrically arranged at four positions under the vibratory structure, and the sensor electrode means includes first and second sensor electrodes interposed between the opposite first and second lower torque electrodes and the opposite third and fourth lower torque electrodes, respectively.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3:
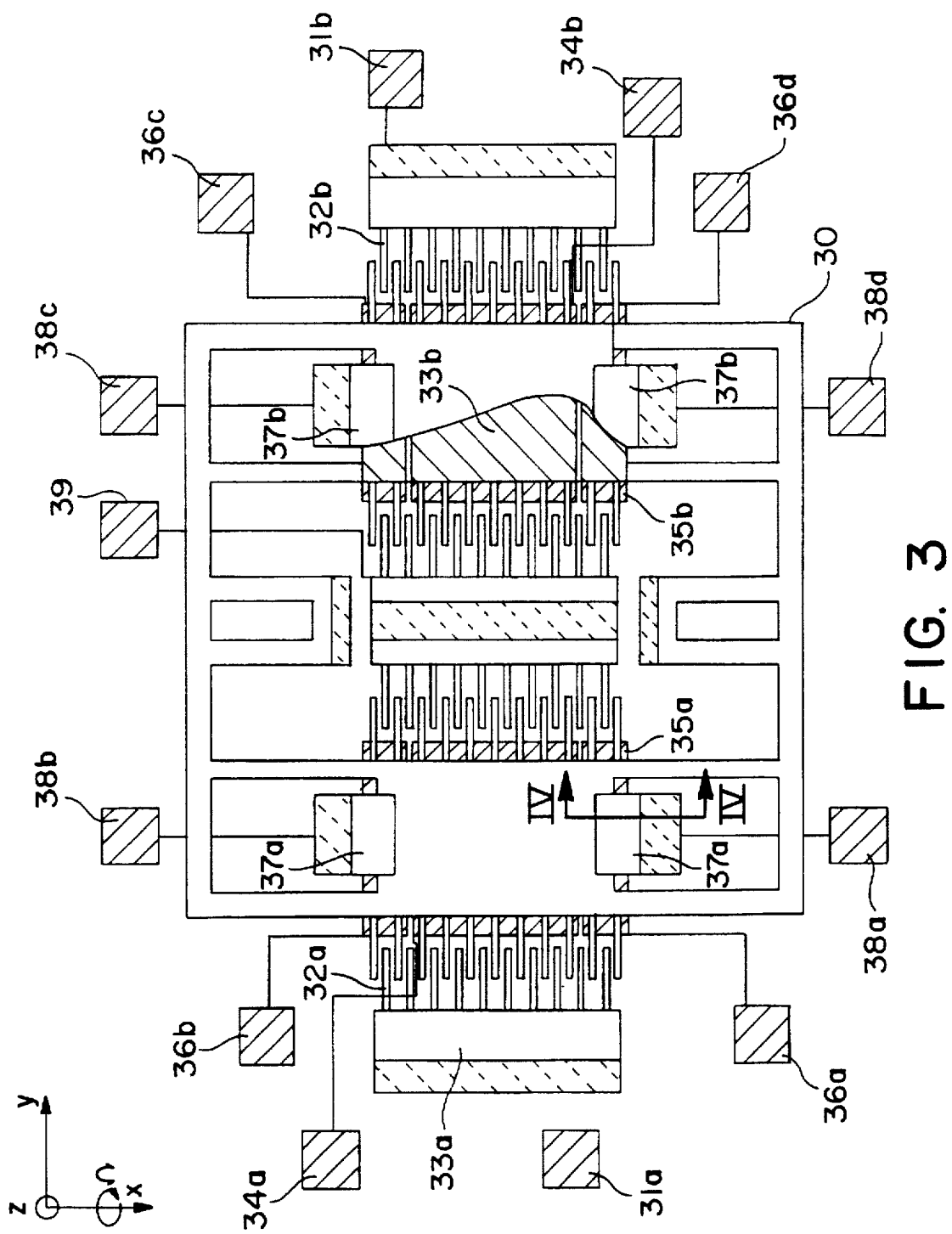
FIG. 3 is a plan view schematically illustrating a tuning fork type gyroscope according to the present invention.

FIG. 3 shows a tuning fork type gyroscope according to an embodiment of the present invention. In FIG. 3, a vibratory structure 30 vibrates in the y-axial direction by application of an alternating voltage to left and right terminals 31a and 31b.

When power is applied to the left and right terminals 31a and 31b, an electrostatic force is generated at combs 32a and 32b. Accordingly, the vibratory structure 30 vibrates in the y-axial direction. When the vibratory structure 30 rotates on the x-axis in a state where the vibratory structure 30 vibrates, the Coriolis force is generated in the z-axial direction. The z-axis Coriolis force acts as a force to distort the vibratory structure 30. The distortion of the vibratory structure 30 incurs a change of capacitance on sensor electrodes 33a and 33b symmetrically arranged to the left and right sides thereunder. By measuring the change of capacitance, an angular velocity of the rotation on the x-axis is evaluated. The left and right sensor electrodes 33a and 33b are connected to left and right sensors 34a and 34b, respectively.

Figure 1:
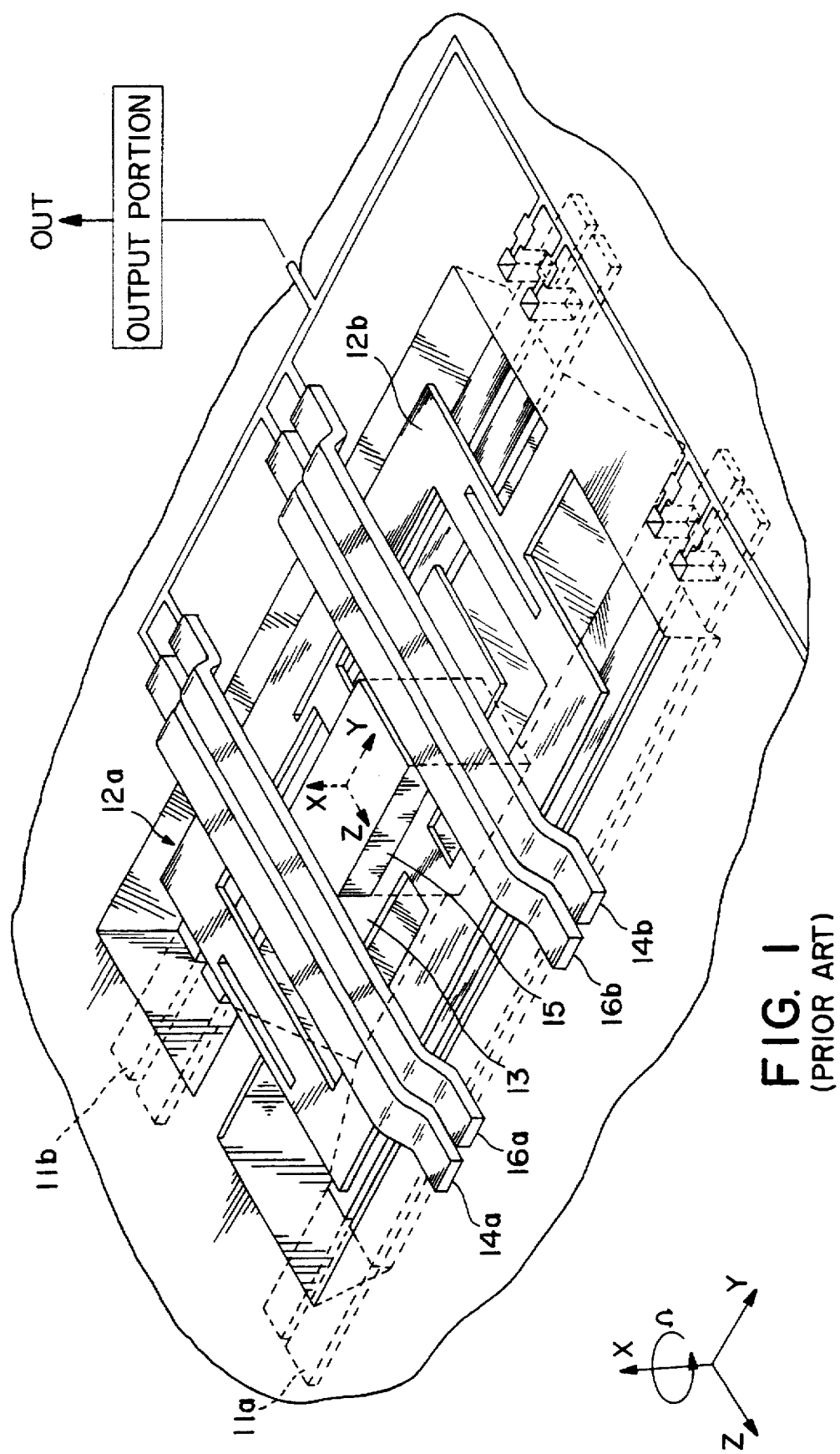
FIG. 1 is a perspective view schematically illustrating a gyroscope according to the prior art.
Figure 2:
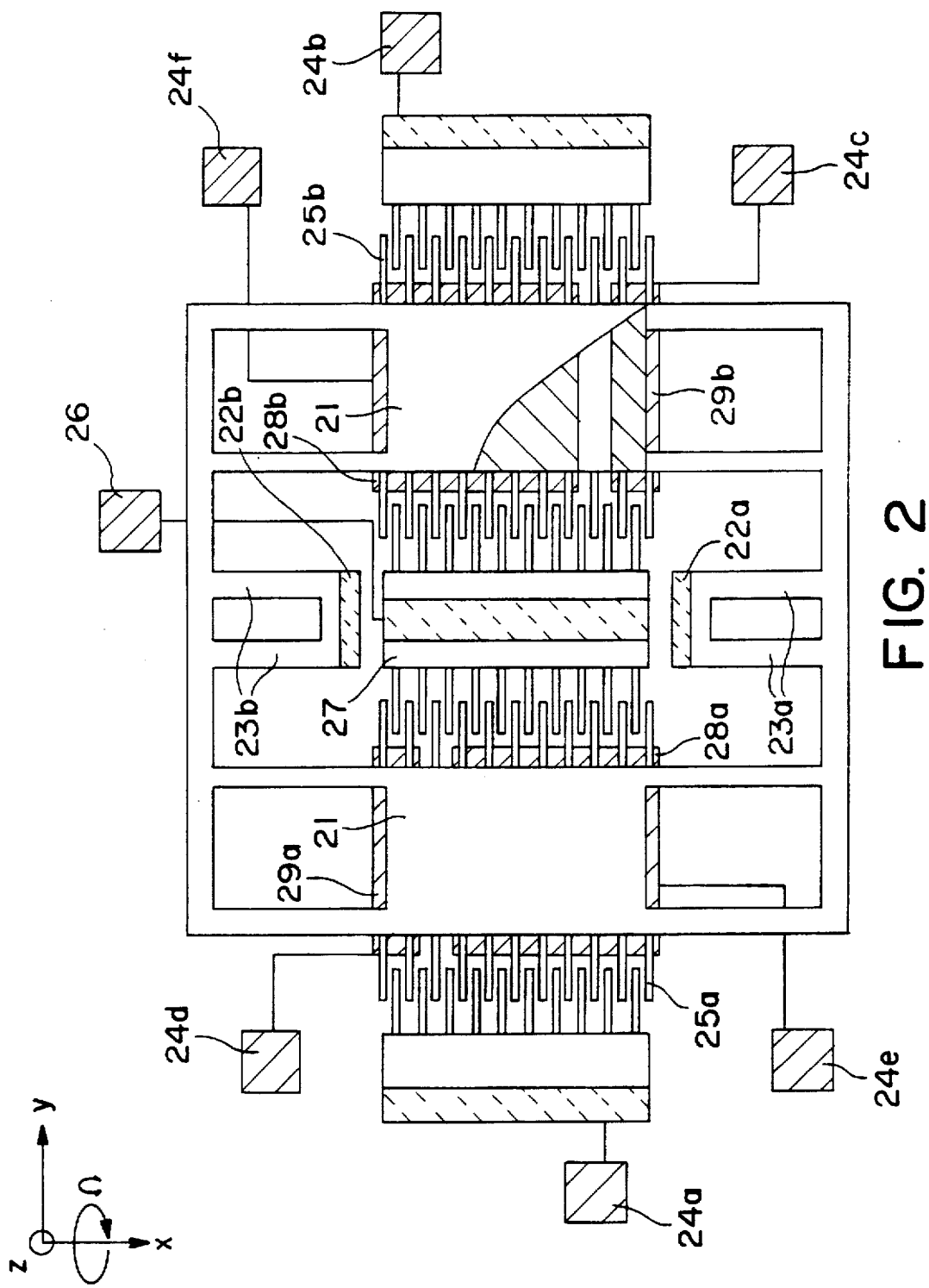
FIG. 2 is a plan view illustrating a tuning fork type gyroscope according to the prior art.

To control the distortion of vibratory structure 30, lower torque electrodes 35a and 35b are arranged at the upper and lower position of the sensor electrodes 33a and 33b in the x-axial direction. The lower torque electrodes 35a and 35b are connected to torque driving electrodes 36a and 36b, and 36c and 36d, respectively. Each of upper torque electrodes 37a and 37b is arranged to overlap at least a part of the lower torque electrodes 35a and 35b, respectively, and the vibratory structure 30 is interposed between the upper torque electrodes 37a and 37b, and the lower torque electrodes 35a and 35b. The upper torque electrodes 37a and 37b are connected to torque driving electrodes 38a and 38b, and 38c and 38d, respectively. Terminal 39 has the same function as terminal 26 in FIG. 2.

As above, in the gyroscope according to an embodiment of the present invention, the upper and lower torque electrodes for balancing the force are arranged in four positions, having the vibratory structure interposed between the upper and lower torque electrodes. In such an arrangement, the vibration of the tuning fork mode in the y-axial direction is not affected, and simultaneously, the electrostatic force to perform the force balancing in the z-axial direction is easily applied.

Figure 4:
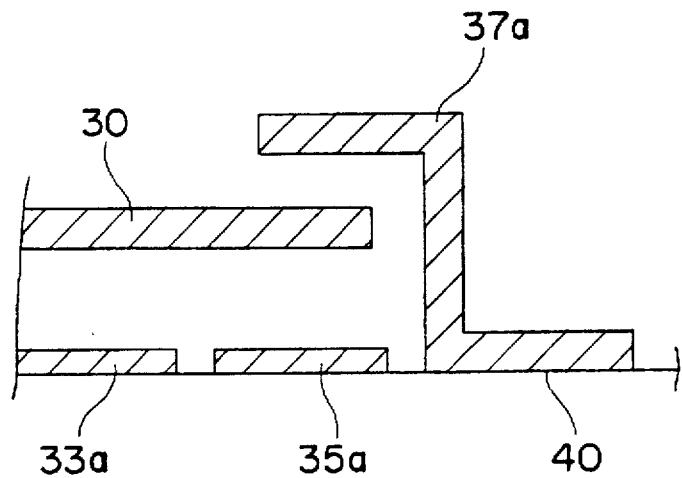
FIG. 4 illustrates an example of a sectional view taken along line IV-IV of FIG. 3.

FIG. 4 illustrates an example of a sectional view taken along line IV-IV of FIG. 3 for schematically describing a state where the upper and lower torque electrodes 37a and 35a are arranged. In FIG. 4, where the same reference numerals denote the same members, the lower torque electrode 35a is separated from the sensor electrode 33a on a surface of substrate 40. The upper torque electrode 37a overlaps the lower torque electrode 35a in the form of a cantilever which is extended from the end of vertical portion attached at the surface of the substrate 40. The vibratory structure 30 is interposed between the lower and upper torque electrodes 35a and 37a.

Figure 5:
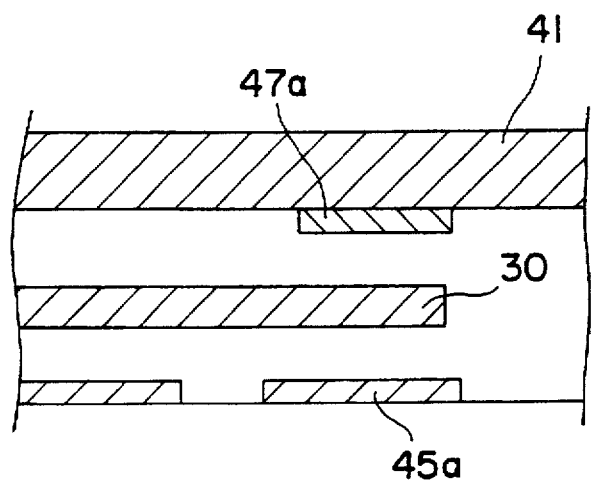
FIG. 5 illustrates another example of a sectional view, being similar to that of FIG. 4, of another embodiment of the present invention.

FIG. 5 shows another example of a sectional view, being similar to that of FIG. 4, of another embodiment according to the present invention. Here, a glass plate 41 is arranged over the vibratory structure 30 and the upper electrode 47a is attached to lower surface of the glass plate 41 to overlap at least a part of the lower electrode 45a.

As described above, in the gyroscope according to the present invention, the force balancing is efficiently made to thereby improve the linearity of response. Also, since the force balancing is achieved by arranging the pair of upper and lower electrodes at the four positions of the vibratory structure, the distortion of the structure is efficiently removed. Further, since force balancing is again made with respect to the Coriolis acceleration after self-balancing is achieved by using a reserved current power, the vibration of the comb structure itself can be reduced. Thus, the gyroscope of the present invention can act efficiently as a sensor hardly affected by the outside interference.

It is noted that the present invention is not limited to the preferred embodiment described above, and it is apparent that variations and modifications by those skilled in the art can be effected within the spirit and scope of the present invention defined in the appended claims.

What is claimed is:

1. A tuning fork type gyroscope comprising:
   a vibratory structure arranged to be spaced from a plane formed by a first axis and a second axis perpendicular thereto in a third axial direction perpendicular to the plane;

driving means for vibrating said vibratory structure in the second axial direction by an electrostatic force;

sensor electrode means arranged on said plane so as to sense displacement of said vibratory structure in the third axial direction while said vibratory structure moves with an angular velocity around the first axis;

upper torque electrode means for balancing the vibratory force of said vibratory structure arranged over said vibratory structure so as to control displacement of said vibratory structure in the third axial direction; and lower torque electrode means for balancing the vibratory force of said vibratory structure arranged under said vibratory structure so as to control displacement of said vibratory structure in the third axial direction;

wherein said lower torque electrode means includes first, second, third and fourth lower torque electrodes symmetrically arranged at four positions under said vibratory structure, wherein said first and second lower torque electrodes and said third and fourth lower torque are opposite from each other, respectively.

2. A tuning fork type gyroscope as claimed in claim 1, wherein said upper torque electrode means is arranged to overlap at least a part of said lower torque electrode means.

3. A tuning fork type gyroscope as claimed in claim 1, wherein said sensor electrode means includes first and second sensor electrodes interposed between said opposite first and second lower torque electrodes and said opposite third and fourth lower torque electrodes, respectively.

4. A tuning fork type gyroscope as claimed in claim 2, wherein said sensor electrode means includes first and second sensor electrodes interposed between said opposite first and second lower torque electrodes and said opposite third and fourth lower torque electrodes, respectively.

5. A tuning fork type gyroscope as claimed in claim 1, wherein a part of said vibratory structure is interposed in the space formed between said upper torque electrode means and said lower torque electrode means.

6. A tuning fork type gyroscope as claimed in claim 2, wherein a part of said vibratory structure is interposed in the space formed between said upper torque electrode means and said lower torque electrode means.

7. A tuning fork type gyroscope as claimed in claim 1, wherein said upper torque electrode means is formed in the shape of cantilever which extends from an end of a vertical portion projecting from said plane.

8. A tuning fork type gyroscope as claimed in claim 2, wherein said upper torque electrode means is formed in the shape of cantilever which extends from an end of a vertical portion projecting from said plane.

9. A tuning fork type gyroscope as claimed in claim 1, further comprising a substrate member arranged over said vibratory structure so that said upper torque electrode means is attached to the lower surface of said substrate member.

10. A tuning fork type gyroscope as claimed in claim 2, further comprising a substrate member arranged over said vibratory structure so that said upper torque electrode means is attached to the lower surface of said substrate member.

11. A tuning fork type gyroscope comprising:

a vibratory structure arranged to be spaced from a plane formed by a first axis and a second axis perpendicular thereto in a third axial direction perpendicular to the plane;

driving means for vibrating said vibratory structure in the second axial direction by an electrostatic force;

sensor electrode means arranged on said plane so as to sense displacement of said vibratory structure in the third axial direction while said vibratory structure moves with an angular velocity around the first axis;

torque electrode means for balancing the vibratory force of said vibratory structure so as to control displacement of said vibratory structure in the third axial direction, including first, second, third and fourth torque electrodes symmetrically arranged at four positions under said vibratory structure.

12. A tuning fork type gyroscope as claimed in claim 11, wherein said torque electrode means further includes four torque electrodes symmetrically arranged at four positions over said vibratory structure.

* * * * *